Aug. 3, 1948.     M. R. RICHMOND     2,446,244
PULSE-ECHO SYSTEM
Filed May 22, 1943     4 Sheets-Sheet 2
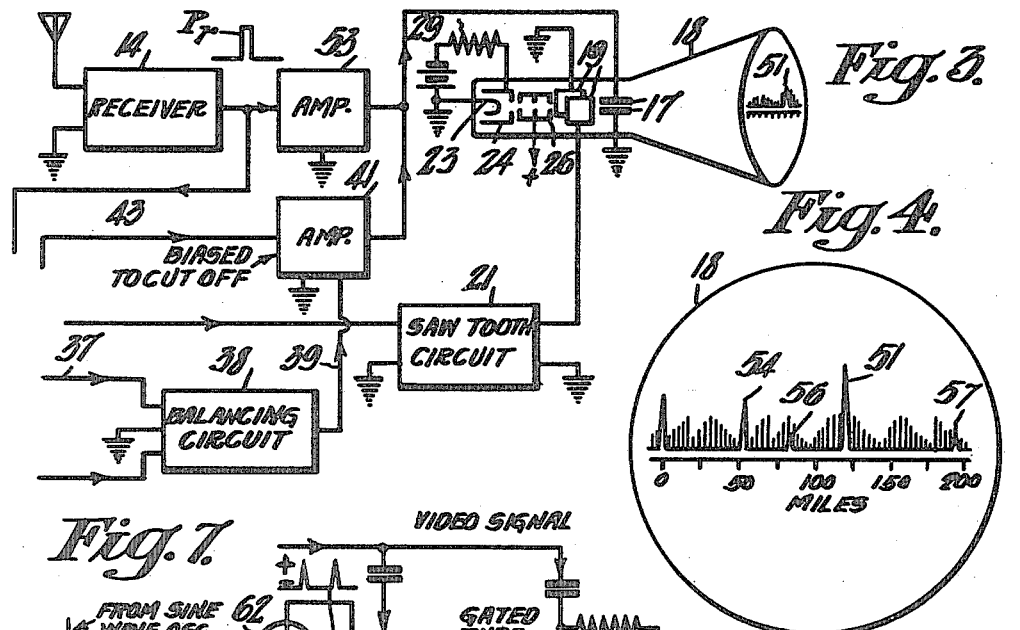
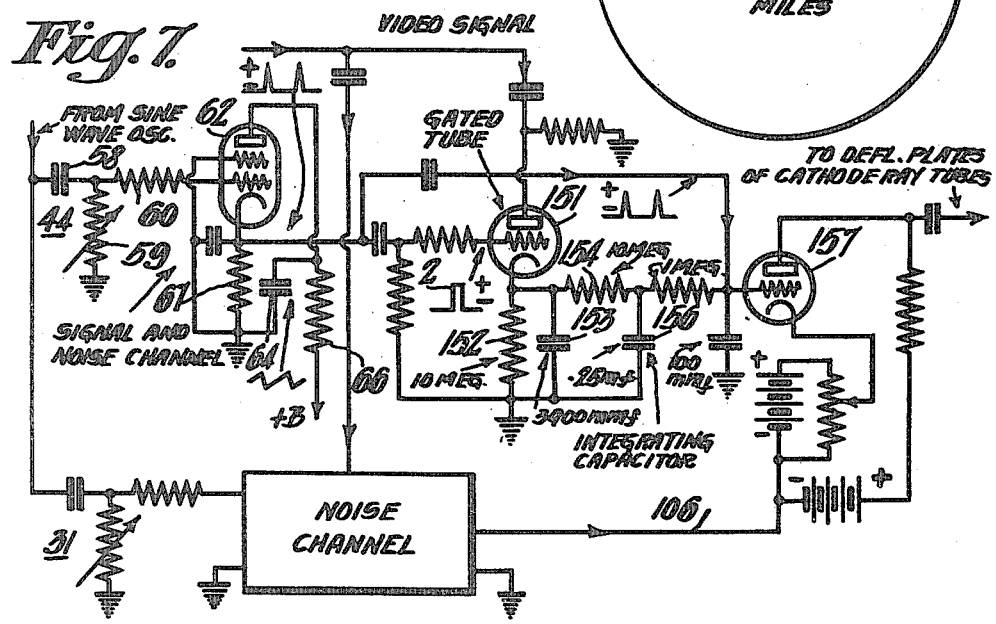
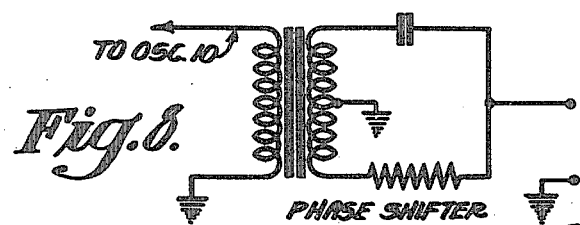
Inventor
Martin R. Richmond
By
Attorney

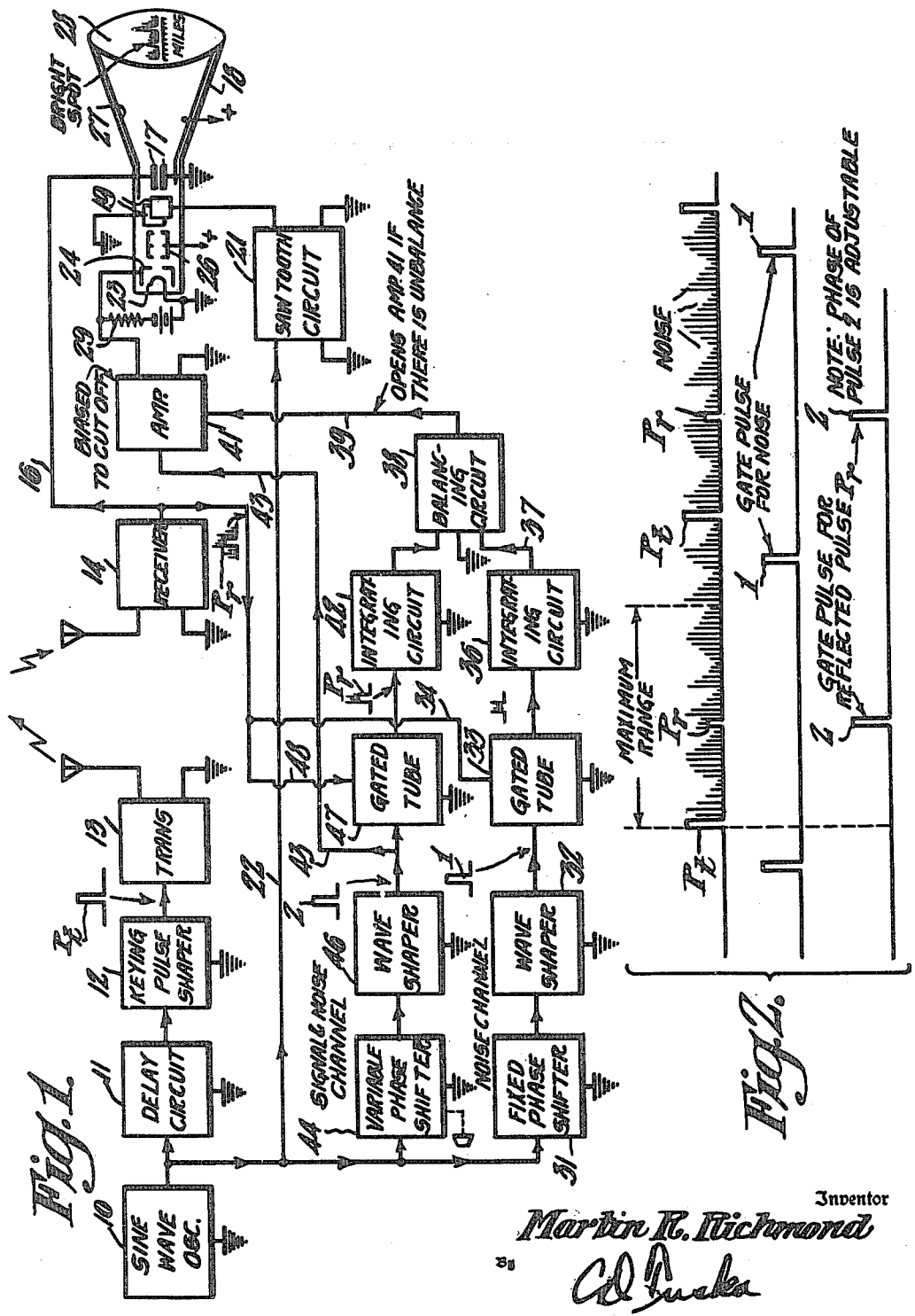

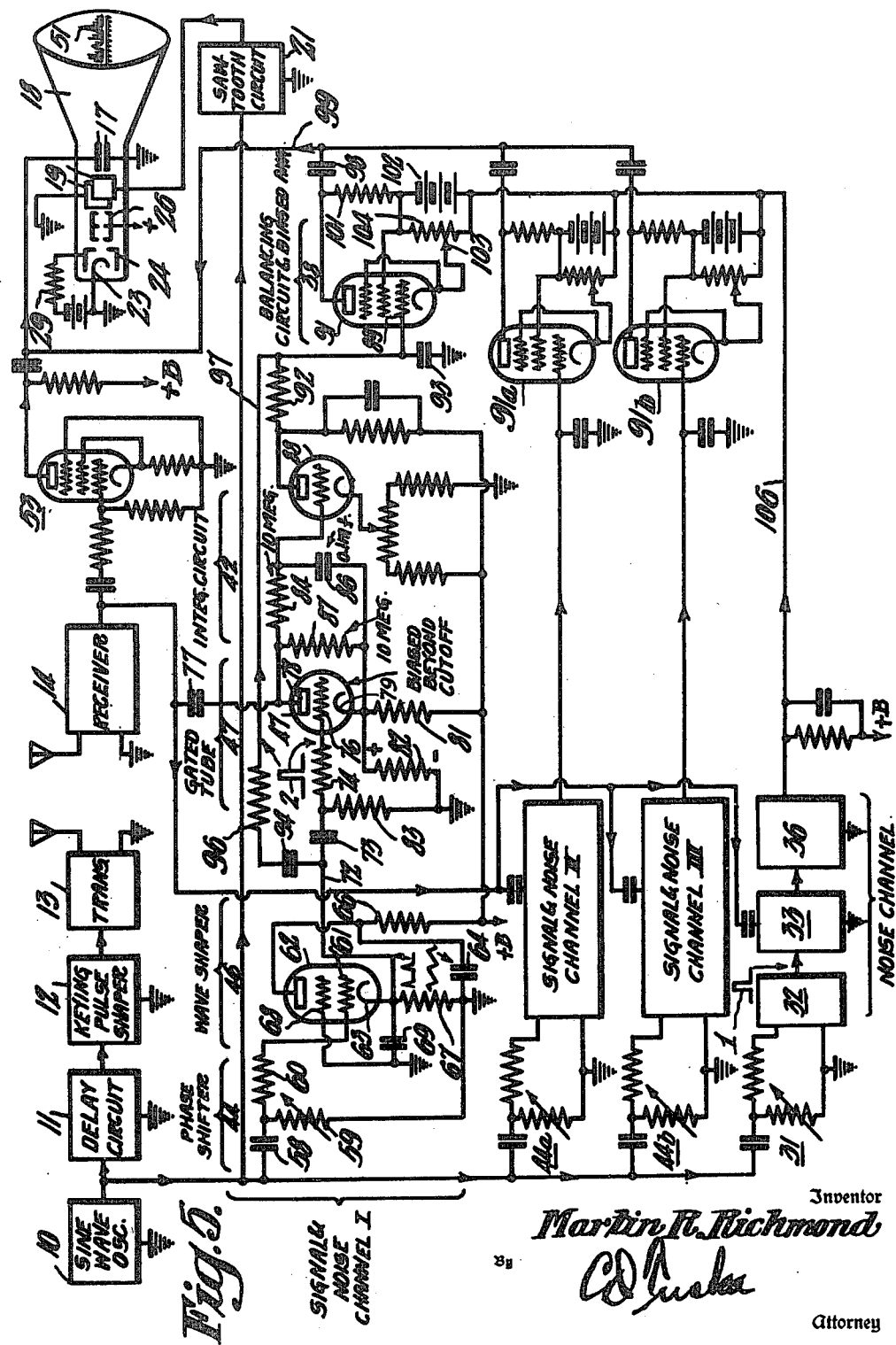

Aug. 3, 1948.   M. R. RICHMOND   2,446,244
PULSE-ECHO SYSTEM

Filed May 22, 1943   4 Sheets-Sheet 4

Inventor
Martin R. Richmond
Attorney

Patented Aug. 3, 1948

2,446,244

UNITED STATES PATENT OFFICE 2,446,244

PULSE-ECHO SYSTEM

Martin R. Richmond, Brooklyn, N. Y., assignor to Radio Corporation of America, a corporation of Delaware Application May 22, 1943, Serial No. 488,302

6 Claims. (Cl. 343—13)

My invention relates to systems for receiving pulses and particularly to distance determining or locating systems of the pulse-echo type. The invention may be applied either to systems employing the transmission of radio pulses or the transmission of sound pulses in water.

It is well known that an object can be located and its distance determined by transmitting periodically recurring pulses toward the object, receiving the pulses after reflection from the object, and determining the time interval between the transmission and reception of each pulse. This time interval is a function of the distance to the object since the velocity of propagation of a pulse is a known value.

An object of the present invention is to provide an improved method of and means for receiving pulse signals or the like when they are accompanied by a large amount of noise or other interfering signal.

Another object of the invention is to provide an improved pulse-echo system that will receive and indicate pulses of lower signal strength than the accompanying noise or other interfering signal.

A further object of the invention is to provide an improved method of and means for increasing the distance range of a pulse-echo system.

The present invention is based on the principle that where the energy content of a pulse receiver consists largely of noise or other random interference, the output energy during a selected time interval following the transmission of a pulse will be increased if a signal pulse is received during said interval, whereas there will be no increase in the output energy during a different selected time interval during which no signal pulse is received. I have discovered that even though the amplitude of the signal pulse is low compared with that of the noise, this increase in energy content can be indicated by storing in one integrating circuit the receiver output corresponding to the first selected time interval in which a signal pulse may appear, by storing in another integrating circuit the receiver output corresponding to a selected time interval during which no signal pulse can be received, and by then applying the two stored or integrated signals to a balancing circuit. The reception of a periodically recurring signal pulse during the first selected time interval will produce an unbalance that indicates the presence of the pulse. Preferably, the receiver output for a large number of recurring time intervals is integrated whereby the random variations in the noise signal are averaged out so that only the reception of signal pulses will cause any substantial change in the integrated signal.

The invention will be better understood from the following description taken in connection with the accompanying drawing in which Figure 1 is a block diagram of a pulse-echo distance indicator system embodying the invention, Figure 2 is a group of graphs that are referred to in explaining the invention, Figure 3 is a block diagram showing a modification of a portion of the system of Fig. 1, Figure 4 is a view of the end of the cathode ray tube of Fig. 3, showing the type of signal indication that is obtained, Figure 5 is a block and circuit diagram of another embodiment of the invention as applied to a pulse-echo system, Figure 6 is a block and circuit diagram of still another embodiment of the invention, Figure 7 is a circuit diagram showing a circuit design that may be utilized in place of a portion of the circuit of Fig. 6, and Figure 8 is a circuit diagram of a phase shifter that may be employed in place of the phase shifters shown in Figs. 5, 6 and 7.

In the several figures, similar parts are indicated by similar reference characters.

Referring to Fig. 1, the invention is shown applied to a radio pulse-echo distance determining system which comprises a sine wave oscillator 10, a delay circuit 11, a pulse shaping circuit 12 for producing a keying or modulating pulse $P_t$, and a radio transmitter 13 which is modulated by the periodically recurring pulses $P_t$. The pulses $P_t$ may occur at the rate of 1000 per second, for example, and may have a width or duration of about 5 microseconds. After reflection from a distant object, such as an approaching airplane, the radio pulses are received by a receiver 14 and demodulated to obtain the "video" frequency pulses $P_r$ which are the pulses $P_t$ after reflection. The pulses $P_r$ are supplied over a conductor 16 to the vertical deflecting plates 17 of a cathode ray tube 18.

The cathode ray of tube 18 is deflected along a time axis by a sawtooth voltage applied to a pair of horizontal deflecting plates 19. This sawtooth voltage is generated in a sawtooth circuit 21 which is synchronized with the transmission of pulses $P_t$ by a signal from the oscillator 10 supplied over a conductor 22. The use of the delay circuit 11 facilitates relative timing of the pulses $P_t$ and the sawtooth waves such that each pulse $P_t$ occurs at the start of the straight portion of the sawtooth.

The cathode ray tube 18 may be of conventional design having a cathode 23, a control electrode 24, a first anode 26, a second anode 27 and a fluorescent screen 28 on the end of the tube envelope. A negative bias is applied to the control electrode 24 through a grid resistor 29. In the particular example being described, this bias is such that the cathode ray trace on the screen 28 is of medium intensity in the absence of additional voltage on the control electrode 24. A distance scale is marked along the time axis at the end of the tube 18.

The system thus far described will give the desired distance indication if the received pulses $P_r$ are of sufficient amplitude with respect to the noise signals. The portion of the system now to be described makes it possible to obtain a distance indication even though the reflected pulses $P_r$ are of less amplitude than the noise signals. This is accomplished by the use of gate pulses, integrating circuits, and a balancing circuit as described below.

A gate pulse 1 is produced and phased to occur in a time region outside the maximum distance range of the system as shown by the graphs in Fig. 2. In Fig. 1, the gate pulse 1 is produced by passing the sine wave signal from oscillator 10 through a phase shifter 31 and a wave shaper circuit 32. The gate pulse 1 is applied to a vacuum tube 33 which is biased to cutoff in the absence of the gate pulse. When the pulse 1 occurs, the tube 33 passes signals from the receiver 14 over a conductor 34 to an integrating circuit 36. In this example, the tube 33 rectifies the receiver output. Thus, the integrating circuit output is a bias voltage having a value depending upon the noise energy that is present in the receiver output during the time intervals that the gate pulses 1 occur. This bias voltage is supplied over a conductor 37 to a balancing circuit 38 which has an output conductor 39 leading to an amplifier 41 that normally is biased to a cutoff or blocked condition.

In this example, the balancing circuit 38 is of some type that changes the bias voltage supplied to amplifier 41 when the bias from integrating circuit 36 and the bias from a second integrating circuit 42 become unequal. This happens when a reflected pulse $P_r$ is received at the same instant that a second gate pulse 2 occurs (as indicated in Fig. 2). As a result, the amplifier 41 is opened up to pass the gate pulse 2 (which is supplied over a conductor 43) and to apply it with positive polarity to the control electrode 24 of the cathode ray tube. This brightens the cathode ray trace to produce a distance indication.

Referring now to the circuit for producing the gate pulse 2 and for producing the bias voltage output of the integrating circuit 42, some of the sine wave signal from oscillator 10 is supplied through a phase shifter 44, which may be variable, to a wave shaper circuit 46 for producing the gate pulse 2. Some of the pulse voltage 2 is supplied over the conductor 43 for the brightening of the cathode ray trace as previously described. The gate pulse 2 is also applied to a vacuum tube 47 which normally is biased to cutoff and which can pass the receiver output signal supplied over a conductor 48 only during the occurrence of the pulse 2. As in the case of the tube 33, the tube 47 supplies a rectified signal to the integrating circuit. If a reflected pulse $P_r$ is received at the same instant that the gate pulse 2 makes the tube 47 operable, there will be supplied to the integrating circuit 42 a signal that consists of both the noise signal and the pulse $P_r$. Therefore, the difference in the energy of the signal integrated by the circuit 36 and of that integrated by the circuit 42 is represented by the periodically recurring pulses $P_r$. The unbalance in circuit 38 caused by this difference indicates the presence of the pulses $P_r$. For a system where the gate pulses 1 and 2 are of the same width or duration, this is based upon the valid assumption that over an integration period long enough to integrate a large number of the pulses $P_r$ and accompanying noise signal, the energy content of the received signal will be the same during the periods of occurrence of the gate pulses 1 as during the periods of occurrence of the gate pulses 2.

The gate pulse 2 for the "signal and noise" channel preferably has a width that is less than that of the received pulses, although its width may be the same as or somewhat greater than that of the received pulses. It has been found, for example, that where the received pulse is of 5 microseconds duration, a duration of about ½ microsecond is satisfactory for the gate pulse 2. The gate pulse 1 may also have a duration of ½ microsecond as assumed above. Preferably, however, the gate pulse 1 for the noise channel is of greater duration, 50 microseconds, for example, in order that a better averaging of the variations in noise signals will be obtained. The difference in the integrated outputs of the two channels resulting from the difference in the widths of the two gate pulses is compensated for at the balancing circuit by proper adjustment thereof.

Fig. 3 shows how the circuit of Fig. 1 may be modified to give the type of indication illustrated in Fig. 4. In Fig. 4 the reflected pulse indication occurring at the same time as the gate pulse 2 is shown at 51, this indication having an amplitude greater than that caused by the noise signals whereby it is clearly visible. In this embodiment of the invention the output of the amplifier 41 is applied to the vertical deflecting plates 17 instead of to the control electrode 24. The output of receiver 14 is also applied to the deflecting plates 17 through an amplifier 53. Therefore, any reflected pulses will be indicated in the usual way as shown at 54 if they are of sufficient amplitude to be above the noise level. Other received pulses, such as those at 56 and 57, which are below the noise level cannot be distinguished from the noise until the phase shifter 44 is adjusted to make the gate pulse 2 occur at the same time as the pulse to be indicated. By adjusting the phase shifter 44, the operator may move the gate pulse 2 along the time axis slowly to search for low amplitude reflections.

Fig. 5 illustrates in more detail an embodiment of the invention that corresponds to the system shown in block diagram in Fig. 1 but having the type of indicator shown in Fig. 3. In Fig. 5, I have shown three "signal and noise" channels I, II and III instead of showing a single "signal and noise" channel as in the case of Fig. 1.

Referring to the first "signal and noise" channel, which is shown in detail, the phase shifter 44 may comprise a capacitor 58 and a variable resistor 59. The sine wave voltage from across resistor 59 is applied through a grid current limiting resistor 60 to the control grid 61 of a gas tube 62 which comprises part of the wave shaper circuit 46. At the cathode 63 of the tube 62 the gate pulses 2 are produced which recur at the sine wave frequency, these pulses being produced as a result of a capacitor 64 receiving a charge through an anode resistor 66 and then being discharged through the tube 62 and through a cathode resistor 67 upon the occurrence of a positive cycle of the sine wave. A second grid 68 of the tube 62 is grounded. The cathode 63 is held at ground potential by means of a bypass capacitor 69 for any video signal that may be fed back to the cathode 63.

The "gated tube" 47 is a three element vacuum tube that is controlled by the gate pulses 2, i. e., it is "gated," to supply rectified video signal to the integrating circuit 42 in response to and for the duration of each gate pulse 2. This is accomplished by supplying the pulses appearing at cathode 63 of the gas tube 62 through a conductor 72, a coupling capacitor 73 and a grid current limiting resistor 74 to the grid 76 of tube 47. The receiver output, which is referred to as the "video" signal, is supplied through a coupling capacitor 77 to the anode 78 of tube 47. It will be noted that the tube 47 has no D.-C. voltage applied to its anode since its is to function as a rectifier.

In the absence of a gate pulse, the tube 47 is biased beyond cutoff since its cathode 79 is connected to a positive point on a voltage divider comprising resistors 81 and 82, and since the grid 76 is connected through a grid resistor 83 to ground.

The receiver output is rectified by the tube 47 during the occurrence of a gate pulse 2 since the pulse 2 drives the grid 76 positive. The resulting rectified signal is applied through a resistor 84 to a storage or integrating capacitor 86. A high impedance resistor 87 is shunted across the tube 47 to prevent a D.-C. potential from building up on the capacitor 86. Thus a bias voltage is built up across the integrating capacitor 86 which is applied through a direct-current amplifier tube 88 to the control grid 89 of a vacuum tube 91 in the balancing circuit 38. The gate pulse 2 is also supplied from the conductor 72 through a coupling capacitor 94, a resistor 96 and a conductor 97 to the grid 89 of the tube 91 whereby it will be passed by tube 91 when it is unbalanced by received pulses as hereinafter described. The coupling between the anode of tube 88 and the grid 89 of tube 91 preferably includes a series resistor 92 for isolating the gate pulse 2 from the tube 88. It may also include a shunt capacitor 93 for widening the gate pulse 2 so that it may be more readily observed on the cathode ray tube screen.

The output circuit of the tube 91 is coupled through a capacitor 98 and a conductor 99 to the vertical deflecting plates 17 of the cathode ray tube 18. Operating voltage is applied through an anode resistor 101 to the anode of tube 91 from a battery 102. The cathode of tube 91 is connected through a variable tap 103 to a point on a potentiometer resistor 104 shunted across battery 102. By adjusting the tap 103 the tube 91 may be adjusted to plate current cutoff for the condition where there are no reflected pulses in the receiver output that are occurring simultaneously with the gate pulses 2.

The balancing bias from the "noise" channel comprising units 31, 32, 33 and 36 is supplied over a conductor 106 to the negative terminal of the battery 102 and thus to the cathode of the tube 91. It will be evident that when the noise signal changes, the resulting change in bias on the grid 89 of tube 91 is accompanied by a like change in bias on the cathode of tube 91 whereby the cutoff condition of the tube is not changed. However, if a reflected pulse is received at the same time that the gate pulse 2 occurs, there is then some signal pulse energy added to the noise energy so that the bias voltage across the intergrating capacitor 86 is increased. Then the grid 89 of tube 91 becomes less negative and the tube 91 passes the gate pulse 2 to the deflecting plates 17 so that it deflects the cathode ray and produces the indication 51.

Any desired number of additional "signal and noise" channels such as the channels II and III may be provided. These channels may be the same as channel I previously described. The tubes 91a and 91b of the channels II and III, respectively, correspond to the tube 91 in the channel I. By adjusting the phase shifters 44a and 44b of the channels I and II, respectively, the gate pulses for these channels may be made to occur at time intervals corresponding to different distances from the pulse transmitter whereby the presence of an approaching aircraft or other object is indicated when it is a predetermined distance away. When the integrating circuits have long time constants, such as time constants of two or three seconds, for example, for obtaining a maximum integration of low amplitude received pulses, this method of operation may be more desirable than the method of continuously changing the phase shifter to "search" for the presence of such pulses.

Fig. 6 shows another embodiment of the invention wherein a plurality of "signal and noise" channels are utilized with gate pulses adjusted to occur at fixed times corresponding to certain distances from the transmitter. In this embodiment a plurality of indicators such as neon lamps 111, 112 and 113 are actuated by the outputs from their respective "signal and noise" channels in response to reflected pulses being received at the same time that a gate pulse occurs. Thus, for example, the lighting of lamp 111 may indicate the presence of an approaching object at a distance of about 150 miles from the transmitter and the lighting of lamp 112 may indicate the presence of an object about 100 miles away.

While the specific circuit for operating the neon lamps 111, 112 and 113 may be the same as the one shown in Fig. 5, a different circuit is shown in Fig. 6. The gate pulse is produced by charging a capacitor 114 through an anode resistor 116 and discharging it through a gas tube 117. The sawtooth wave is differentiated by the small capacitor 118 and the resistor 119 to produce pulses of negative polarity which are applied to the grid 120 of a vacuum tube 121 with sufficient amplitude to drive the tube beyond cutoff. The grid 120 is connected to the +B voltage supply through the high impedance resistor 119 of the differentiating circuit whereby positive polarity voltage variations on the grid 120 do not appear in the output of tube 121. Thus, the tube 121 clips the applied negative pulses in both the negative and positive directions to produce the gate pulse 2.

The output signal from receiver 14 is applied to the grid of a vacuum tube 122 so that it is added to the gate pulse in the common plate resistor 123. The resulting signal, indicated at 126, is applied to the anode of a rectifier tube 127 whereby its cathode 125 acquires a positive bias due to the voltage built up across a resistor-capacitor circuit 128—129. Therefore, the tube 127 rectifies only the portion of the receiver output appearing on top of the gate pulse 2. This rectified noise signal (and pulse signal if a pulse is present) is supplied through a resistor 131 to an integrating or storage capacitor 132. A bias voltage builds up across capacitor 132 in accordance with the energy present in the rectified signal. This bias voltage is impressed upon a direct-current amplifier 133 which applies the amplified bias voltage through a resistor 134 to one deflecting plate 136 of an electron beam tube 137. The amplifier 133 obtains its plate voltage from a voltage divider 138 which is connected to a positive voltage source indicated at "+300" through a conductor 135 and a gas filled regulator tube 140.

In the present embodiment of the invention the tube 137 functions as the balancing circuit by virtue of the fact that a bias voltage from the "noise" channel D is supplied through a conductor 138 and a resistor 139 to the other deflecting plate 141 of the tube 137. The beam tube 137 is of a well known type which operates to pass beam electrons to an output electrode 142 only when unequal voltages on the deflecting plates 136 and 141 deflect the beam past a target 143. When the beam is so deflected, there is a voltage drop across an output resistor 144 which lights the lamp 11.

It will be understood that the "noise" channel D may be the same as the channel A shown in detail. Likewise, any additional "signal and noise" channels such as channels B and C may be the same as channel A.

Fig. 7 illustrates an embodiment of the invention in which the "gated tube," indicated at 151, is biased substantially to cutoff by the receiver signal that is applied to its anode. The resulting current flow through the tube 151 and through a cathode resistor 152 builds up a biasing voltage on the shunting capacitor 153. During the occurrence of a gate pulse 2, the grid of tube 151 is made less negative whereby the noise signal (and the reflected pulse signal, if present) is rectified and applied through a resistor 154 to an integrating capacitor 156. The resulting bias voltage across capacitor 156 is applied to the grid of a vacuum tube 157 comprising the balancing circuit. The bias voltage output of the noise channel is applied over a conductor 106 to the cathode of the tube 157, and the tube 157 is adjusted to a balanced condition in the absence of received pulses as described in connection with Fig. 5.

Fig. 8 illustrates a well known type of phase shifter that may be substituted for the simple resistor-capacitor phase shifters shown in the other figures. Such substitution is desirable if the phase shifter is to be adjusted for moving the gate pulse along the time axis to search for the presence of a low amplitude reflected signal. The reason for this is that the output of the phase shifter of Fig. 8 does not change in amplitude as the phase is shifted whereas the amplitude does change when employing the simple resistor-capacitor phase shifter.

In the several figures, some of the circuit values are indicated, merely by way of example, in megohms, microforads and micro-microfarads.

I claim as my invention:

1. The method of improving signal-to-noise ratio which includes receiving desired signals plus undesired noise signals during one time interval, receiving undesired noise signals without said desired signals during a different discrete and non-overlapping time interval, comparing the energy corresponding to the received desired signals plus undesired noise signals received during said one time interval with the energy corresponding to the received undesired noise signals received during said different time interval, and indicating the desired signals as a function of said comparison.

2. In a pulse-echo system, a pulse receiver, a pair of integrating circuits connected to receive signal from said receiver, means for producing a gate pulse which occurs in a time interval during which an echo pulse may be received, means for producing a second gate pulse which occurs in a later time interval during which no echo pulse can be received, means for supplying signal from said receiver to said two integrating circuits during the ocurrence of said two gate pulses, respectively, means for balancing the outputs of said integrating circuits against each other for the condition when there is no echo pulse being received during said first gate pulse, and means for indicating an unbalance resulting from the reception of echo pulses during the occurrence of said first gate pulse.

3. In a pulse-echo system, a pulse receiver, a pair of integrating circuits connected to receive signal from said receiver, means for producing a gate pulse which occurs in a time interval during which an echo pulse may be received, means for producing a second gate pulse which occurs in a later time interval during which no echo pulse can be received, means for supplying signal from said receiver to said two integrating circuits during the occurrence of said gate pulses, respectively, means for balancing the outputs of said integrating circuits against each other for the condition when there is no echo pulse being received during said first gate pulse, means for indicating an unbalance resulting from the reception of echo pulses occurring during the occurrence of said first gate pulse, and means for adjusting the time of occurrence of said first gate pulse.

4. In a pulse-echo system, a pulse receiver, a pair of integrating circuits connected to receive signal from said receiver, means for producing a gate pulse which occurs in a time interval during which an echo pulse may be received and which is of short duration compared with the duration of the echo pulse, means for producing a second gate pulse which occurs in a later time interval during which no echo pulse can be received, means for supplying signal from said receiver to said two integrating circuits during the occurrence of said gate pulses, respectively, means for balancing the outputs of said integrating circuits against each other for the condition when there is no echo pulse being received during a gate pulse, and means for indicating an unbalance resulting from the reception of echo pulses occurring during the occurrence of a gate pulse.

5. In a pulse-echo system, a pulse receiver, a plurality of integrating circuits connected to receive from said receiver, means for producing a plurality of signal gate pulses which occur in time intervals during which echo pulses may be received, means for producing a noise gate pulse which occurs in a later time interval during which no echo can be received, means for supplying signal from said receiver to said integrating circuits during the occurrence of said gate pulses, respectively, means for balancing the outputs of each of said plurality of integrating circuits against the output of the integrating circuit which is supplied with signal during the occurrence of the noise gate pulse, said balancing being for the condition when integrated noise signal only is being supplied to the balancing circuit, and a plurality of indicating means for indicating unbalances of said balancing circuits, respectively, resulting from the reception of echo pulses during the occurrence of said signal gate pulses, respectively.

6. In a pulse-echo system, a pulse receiver having a plurality of signal channels, a plurality of integrating circuits connected to receive signal from said signal channels, respectively, means for producing a plurality of signal channel gate pulses which occur at time intervals during which echo pulses may be received, means for applying said gate pulses to said signal channels, respectively, to make them pass the receiver output signal to the integrating circuits only in response to and for the duration of the respective gate pulses, said receiver also having a noise channel and an integrating circuit connected to receive signal therefrom, means for producing a noise channel gate pulse which occurs at a later time interval during which no echo pulse can be received, means for applying said noise channel gate pulse to said noise channel to make it pass the receiver output signal to the last integrating circuit in response to and for the duration of said noise channel gate pulse, a plurality of balancing circuits, means for supplying the integrated output of the noise channel to each of said balancing circuits, means for supplying the integrated outputs of the signal channels to said balancing circuits, respectively, each of said balancing circuits being balanced for the condition where no echo pulse is being received during the occurrence of the signal channel gate pulse controlling the signal channel that supplies the balancing circuit, and means for indicating the unbalance of any one of said balancing circuits resulting from the reception of an echo pulse during the occurrence of a signal channel gate pulse.

MARTIN R. RICHMOND.

REFERENCES CITED

The following references are of record in the file of this patent:

UNITED STATES PATENTS

| Number | Name | Date |
|---|---|---|
| 2,047,153 | Mitchell | July 7, 1936 |
| 2,208,349 | Ulbricht | July 16, 1940 |